United States Patent
Phillips et al.

(10) Patent No.: US 7,060,636 B2
(45) Date of Patent: Jun. 13, 2006

(54) TUNABLE DIELECTRIC DEVICE AND PROCESS RELATING THERETO

(75) Inventors: Janice P. Phillips, Salem, VA (US);
Bryan E. Koene, Blacksburg, VA (US);
Steven A. Stevenson, Hattiesburg, MS (US); Daniela M. Topasna, Lexington, VA (US); Martin E. Rogers, Blacksburg, VA (US)

(73) Assignee: Luna Innovations Incorporated, Blacksburg, VA (US)

( * ) Notice: Subject to any disclaimer, the term of this patent is extended or adjusted under 35 U.S.C. 154(b) by 133 days.

(21) Appl. No.: 10/960,341

(22) Filed: Oct. 7, 2004

(65) Prior Publication Data

US 2005/0085051 A1    Apr. 21, 2005

Related U.S. Application Data

(60) Provisional application No. 60/510,476, filed on Oct. 10, 2003, provisional application No. 60/510,477, filed on Oct. 10, 2003.

(51) Int. Cl.
*H01L 21/31* (2006.01)

(52) U.S. Cl. ......... 438/780; 438/778; 534/11; 534/15

(58) Field of Classification Search ......... 534/11; 556/1
See application file for complete search history.

(56) References Cited

U.S. PATENT DOCUMENTS 5,547,774 A    8/1996    Gimzewski et al.
5,717,076 A    2/1998    Yammamoto et al.
6,303,760 B1 *  10/2001    Dorn et al. ............... 534/11
2004/0054151 A1 *  3/2004    Dorn et al. ............... 534/15

OTHER PUBLICATIONS

R.M. Walser et al., "Shape-Optimized Ferromagnetic Particles with Maximum Theoretical Microwave Susceptibility," IEEE Transactions on Magnetics, Jul. 1998, pp. 1390-1392, vol. 34.

Richard W. Ziolkowski et al., "Passive Artificial Molecule Realizations of Dielectric Materials," J. Appl. Phys 82(7), Oct. 1, 1997, pp. 3195-3198.

Marilyn M. Olmstead et al., "Isolation and Crystallographic Characterization of ErSc2N@C80: an Endohedral Fullerene Which Crystallizes with Remarkable Internal Order," J.Am. Chem. Soc., Nov. 18, 2000, pp. 12220-12226, vol. 122.

F. Wudl et al., "Chapter 11: Survey of Chemical Reactivity of C60, Electrophile and Dieno-polarophile Par Excel-

(Continued)

*Primary Examiner*—Ha Nguyen
*Assistant Examiner*—Kyoung Lee
(74) *Attorney, Agent, or Firm*—Joy L. Bryant (57) ABSTRACT

The present invention is directed toward a tunable dielectric device comprising: a substrate and an endohedral fullerene encapsulating trimetallic nitride template compound disposed on the substrate. The endohedral fullerene encapsulating trimetallic nitride template compound has a dipole moment that is oriented when a voltage of less than about 5 volts is applied thereto causing a change in the orientation of the dipole moment of the compound. The physical dimension of the compound is essentially unchanged.

27 Claims, 6 Drawing Sheets

OTHER PUBLICATIONS lence," Fullerenes: Synthesis, Properties, and Chemistry of Large Carbon Clusters, 1992, pp. 161-175.

Ram Seshadri et al., "Addition of Amines and Halogens to Fullerenes C60 and C70," Tetrahedron Letters, 1992, pp. 2069-2070, vol. 33, No. 15.

Majid Keshavarz-K et al., "Cyanodihydrofullerenes and Dicyanodihydrofullerene: The First Polar Solid Based on C60," J. Am. Chem. Soc., 1995, pp. 11371-11372, vol. 117.

Majid keshavarz-K et al., "Linear Free Energy Relation of Methanofullerene C61-Substituents with Cyclic Voltammetry: Strong Electron Withdrawal Anomaly," Tetrahedron, 1996, pp. 5149-5159, vol. 52, No. 14.

Paul J. Fagan et al., "Synthesis, Chemistry, and Properties of a Monoalkylated Buckminsterfullerene Derivative, t-BuC60 Anion," J. Am. Chem. Soc., 1992, pp. 9697-9699, vol. 114.

Andreas Hirsch et al., "Globe-trotting Hydrogens on the Surface of the Fullerene Compound C60H6(N(CH2CH2)2O)6," Agnew, Chem. Int. Ed. Engl., 1991, pp. 1309-1310, vol. 30,No. 10.

Dominique Armspach et al., "Bucky-ligands: fullerene-substituted oligopyridines for metallosupramolecular chemistry," Chem. Commun., 1996, pp. 2009-2010.

S. Stevenson et al., "A stable non-classical metallofullerene family," Nature, Nov. 23, 2000, pp. 427-428, vol. 408.

* cited by examiner

TUNABLE DIELECTRIC DEVICE AND PROCESS RELATING THERETO

CROSS-REFERENCE TO RELATED APPLICATIONS

This application claims the benefit of U.S. Provisional Patent Application Ser. No. 60/510,476, entitled, "Dielectric Applications Employing Metal-Incorporated Carbon Cage Materials," filed Oct. 10, 2003, and U.S. Provisional Patent Application Ser. No. 60/510,477, entitled, "Organic Thin films with Tunable Dielectric Properties," filed Oct. 10, 2003, both of which are hereby incorporated by reference in their entirety.

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of Contract No. DAAH01-02-C-R084 awarded by Missile Defense Agency.

FIELD OF THE INVENTION

The present invention is related to dielectric devices. In particular, it relates to dielectric devices fabricated from trimetal encapsulated fullerene materials.

BACKGROUND OF THE INVENTION

When fabricating devices that are incorporated into microwave applications and tunable filters (referred to hereafter as tunable dielectric devices) including resonators, filters, and phase shifters that are used in constructing phased array antennae, rectennae for conversion of microwave to dc power, and variable capacitors, it is desirable to employ materials that have minimal power losses in the microwave region of 1 GHz–1000 GHz. In addition, it is desirable to use a material that does not require high voltage to achieve the properties required to be effective. Typically, ferromagnetic materials such as ferrites (e.g., cubic Mn—Zn and Ni—Zn) are used for high frequency microwave applications. These magnetic materials rely on electric or magnetic fields to vary the magnetic permeability of the material to tune the microwave properties. However, ferrites are insufficient for the stringent requirements for new antennae and rectennae over a wide frequency range due to high power losses in this region. Moreover, ferrites require high voltage for the electromagnets to achieve the field required for their effectiveness. Similarly, ceramic ferroelectric materials with high electric permittivity (e.g., barium titanate, strontium titanate, barium strontium titanate) also require high voltage to tune microwave properties. In both instances, these types of devices are very costly.

Piezoelectric materials are also potential candidates for microwave device applications. However, these materials are undesirable for use in microwave device applications and as tunable filters because piezoelectric materials undergo a significant physical change, placing greater complexity in device design.

Stevenson et al. ("Small-bandgap endohedral metallofullerenes in high yield and purity," Nature, Sep. 2, 1999, Vol. 401, pp. 55–57) describe a technique where the introduction of small amounts of nitrogen into an electric-arc reactor allows for the efficient production of a new family of stable endohedral fullerenes encapsulating trimetallic nitride clusters, $Er_x$—$Sc_{3-x}N@C_{80}$ (x=0–3). The trimetallic nitride template process generates milligram quantities of product containing for example 3–5% $Sc_3N@C_{80}$, allowing isolation of the material and determination of the crystal structure, optical and electronic properties. The $Sc_3N$ moiety is encapsulated in a highly symmetric, icosahedral $C_{80}$ cage, which is stabilized as a result of charge transfer between the nitride cluster and fullerene cage. Their method provides access to a range of fullerene materials whose electronic properties can be changed by encapsulating nitride clusters containing different metals and metal mixtures. Although Stevenson et al. describe trimetallic nitride cluster formation, they fail to provide a specific use for these materials.

Dorn et al. in US Patent Application Publication US 2004/0054151A1 describes trimetallic nitride endohedral metallofullerene derivatives having the general formula $A_{3-n}X_nN@C_m(R)$, wherein A is a metal; X is a second metal; n is an integer from 0–3; m is an even integer from about 68 to about 200; and R is an organic group. By varying the organic groups on the exterior of the fullerene cage, the choice of the encapsulated metal complex, and the size of the fullerene cage, one can change the properties of the trimetallic nitride template fullerenes to fit a particular application. For example, these derivatives can have properties that can find utility in conductors, semiconductors, superconductors, or materials with tunable electronic properties such as quantum computers, optical limiters, nonlinear optical devices, ferroelectrics, and dielectrics. However, Dorn et al. fail to describe how these materials could be made into such devices, or that such devices have characteristic properties that can be tuned at voltages of less than about 5 volts. Moreover, Dorn et al. fail to disclose that in order to make these materials tunable, the metals contained within the fullerene cage (A and X) must be different from one another, and n must be an integer from 1–2, not 0–3.

Gimzewski et al. in U.S. Pat. No. 5,547,774 describe the use of endohedral metallofullerenes and derivatives thereof as storage elements. In particular, they describe endohedrally doping the fullerenes so they are switchable between at least two distinct states. Endohedral doping is defined as placing the dopant in the interior of the fullerene's cage. As the different electronic states are separated by a potential barrier, once distorted the molecule retains its current electronic state until the potential barrier is diminished. This is preferably done by applying an external electric field across the molecules. In addition, the electronic state of the material may be stabilized by applying a DC electric field across the molecules. The teaching of Gimzewski et al. is limited to only a single dopant (there is no mention of a charged molecular complex comparable to $A_{3-n}X_nN$) contained within the fullerene cage and also to electronic distortions that result in different electronic states which may or may not result from the movement of the dopant atoms in the fullerene cage (as shown in FIG. 3 of the U.S. patent). Thus, the states are switched not by molecular movement of atoms within the cage but by applying a relatively large potential between the tip of a scanning microscope and the substrate. This induces an electronic potential that enables access to otherwise unavailable electronic states of the molecule. These states result from distortions caused by application of an electric field and, thus, not the molecules within the fullerene cage. Therefore, in order to induce the electronic state, an electric field must be applied. In contrast, the present invention has an inherent molecular dipole that allows for an infinite number of orientations that are controlled by applying an electric field.

An object of the present invention is to provide a tunable device and method for making such device that employs the use of fullerenes encapsulating trimetallic nitride template compounds which are subjected to voltages of less than about 5 volts in order to orient the dipole moments of the bulk material.

Another object of the present invention is to provide a tunable dielectric device and method that employs a material capable of maintaining its physical dimensions when the dipole moment has been oriented.

SUMMARY OF THE INVENTION

A tunable dielectric device and process for making such a device are presented herein. For the purpose of this specification and the appended claims, tunable is defined as the ability of a material to store a charge from an applied electrical field without conducting electricity. Alignment of the dipole moment in an electric field results in devices having tunable microwave properties. The tunable dielectric devices of the present invention are unique from those of the prior art in that the voltage required to change the dipole moment is significantly lower (less than about 5 volts) than that employed in prior art devices. In addition, the materials comprising the tunable dielectric devices do not undergo physical dimension changes (such as shrinkage, puckering or other distortions) that classical or traditional dielectric materials have been known to undergo.

The process for preparing tunable dielectric materials of the present invention is carried out by first providing a substrate. An endohedral fullerene encapsulating trimetallic nitride template compound having the formula:

$$A_{3-n}X_nN@C_m$$

where:
n is either 1 or 2;
m ranges from about 68 to about 200;
A is a first metal;
X is a second metal; and wherein the endohedral fullerene encapsulating trimetallic nitride template compound has a dipole moment. For the purpose of this specification and the appended claims, it is understood that the complex formula $A_{3-n}X_nN$ has a dipole moment resulting from A not being the same metal as X. Moreover, the complex is freely rotating within the fullerene cage at standard temperatures and pressures.

The endohedral fullerene encapsulating trimetallic nitride compound is disposed or deposited on the substrate. A voltage of less than about 5 volts is applied to the endohedral fullerene encapsulating trimetallic nitride template compound. The dipole moment of the compound is oriented by adjusting magnitude and direction of the voltage as it is applied such that the physical dimension of the endohedral fullerene encapsulating trimetallic nitride template compound is essentially unchanged. The resulting tunable dielectric device is a device selected from the group consisting of: tunable filters, resonators, filters, phase shifters, phased array antennae, rectennae, and variable capacitors.

Additional objects and advantages of the invention will be set forth in part in the description which follows, and in part, will be obvious from the description, or may be learned by practice of the invention. The objects and advantages of the invention will be obtained by means of instrumentalities in combinations particularly pointed out in the appended claims.

BRIEF DESCRIPTION OF THE DRAWINGS

The accompanying drawings illustrate a complete embodiment of the invention according to the best modes so far devised for the practical application of the principals thereof, and in which.

DETAILED DESCRIPTION OF THE PREFERRED EMBODIMENTS

Figure 1:
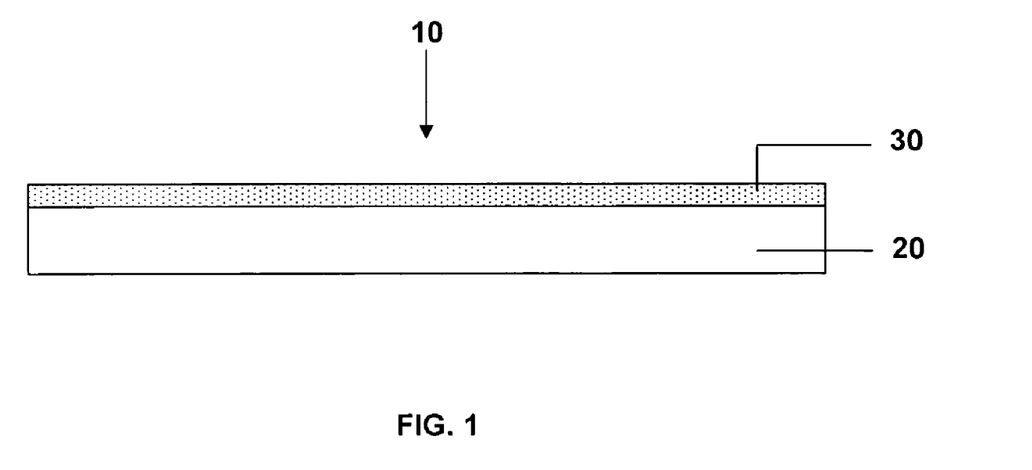
FIG. 1 is a general schematic of a tunable dielectric device of the present invention.

Referring now to the figures, where similar elements are numbered the same throughout, FIG. 1 depicts a tunable dielectric device of the present invention 10. In general, the tunable dielectric device 10 comprises a substrate 20 having an endohedral fullerene encapsulating trimetallic nitride template compound 30 (referred to hereafter as a trimetasphere) disposed on the substrate 20. Any substrate known to one of ordinary skill in the art may be employed for the present invention. However, metal substrates are preferred. Alternatively, metal filled polymeric substrates are also suitable. Examples of various metal substrates include but are not limited to aluminum and indium tin oxide. Most preferably, the substrate is aluminum.

The trimetasphere compounds of the present invention have the general formula:

$$A_{3-n}X_nN@C_m$$

where:
n is either 1 or 2;
m ranges from about 68 to about 200;
A is a first metal;
X is a second metal.

The endohedral fullerene encapsulating trimetallic nitride template compound has a dipole moment. The metal atoms incorporated into a carbon cage fullerene structure have a resulting dipole because metal A is different from metal X. More specifically, the complex formula $A_{3-1\ n}X_nN$ has a dipole moment resulting from metal A not being the same metal as metal X. The complex is freely rotating within the fullerene cage at standard temperatures and pressures. Any metal known to one of ordinary skill in the art may be encapsulated in the carbon cage. In particular, A and X are defined as being selected from the group consisting of: Gadolinium; Scandium; Yttrium; Lanthinum; Cerium; Praseodyminium; Neogymium; Terbium; Dysprosium; Holmium; Erbium; Thulium; Ytterbium; and Lutetium. It is important to emphasize that A and X must differ from each other. For example, if A is Gadolinium, X cannot be Gadolinium. Any combination of metals may be incorporated in the carbon cage based on the structural formula above. In a most preferred embodiment of the invention, the trimetasphere compound is defined as having the formula:

wherein:
n is either 1 or 2;
A is Scandium;
X is a metal other than Scandium; and
m is 80.

Many carbon cage hosts are included in the class of fullerene compounds. For example, such hosts include but are not limited to $C_{60}$, $C_{68}$, $C_{70}$, $C_{78}$, $C_{80}$, $C_{82}$, $C_{84}$, $C_{86}$, $C_{88}$, $C_{90}$, and $C_{92}$. Most preferably, the fullerene cage has a $C_{80}$ structure.

It has recently been found that these fullerene cages may be derivatized by adding various functional organic groups to the outside of the cage. These groups affect the solubility of the fullerenes, or enhance compatibility with one or more other components, such as an organic polymer. The derivatized endohedral fullerene encapsulating trimetallic nitride template compound has the general formula:

where:
n is either 1 or 2;
m ranges from about 68 to about 200;
A is a first metal;
X is a second metal, not the same as A;
R is an organic group; and
Z is less than or equal to m.
Typical R groups are those from Groups IVA, VA, VIA, and VIIA.

The derivatized trimetaspheres have demonstrated a puckering effect on the fullerene cage. Thus, when a voltage is applied to a derivatized trimetasphere, a rotational barrier is created by the puckering effect and the metal molecules contained within the fullerene cage are fixed in that particular orientation. No further rotation will occur unless the derivatized trimetasphere is subjected to subsequent voltage or other perturbation that will remove the rotational barrier. As a result of this effect, derivatized trimetaspheres are particularly useful for applications where it is desirable to have the tuned dielectric material stabilized.

Figure 2A:
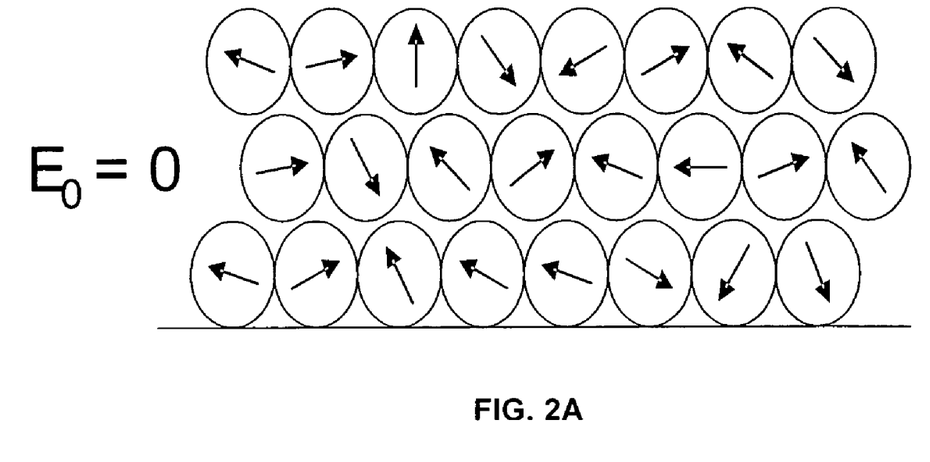
FIG. 2A depicts the configuration of the endohedral fullerene encapsulating trimetallic nitride template compound prior to application of an electric field (E).
Figure 2B:
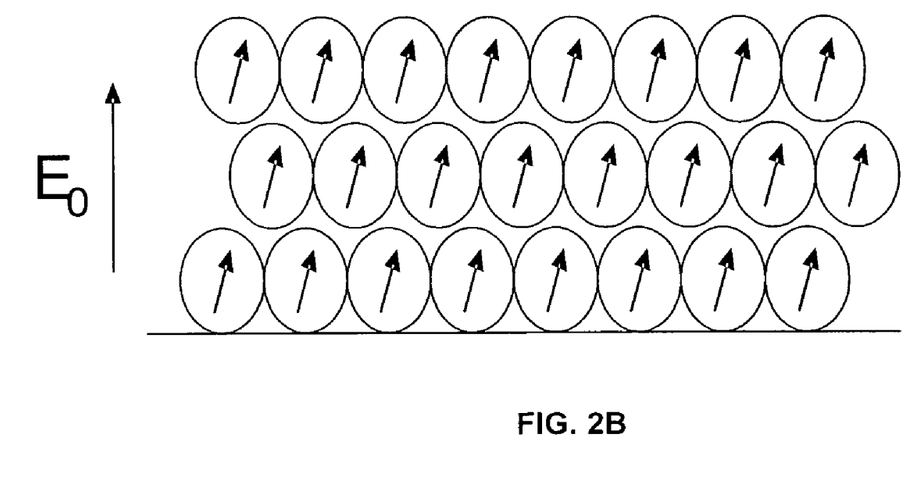
FIG. 2B depicts the orientation of the molecular dipoles of the endohedral fullerene encapsulating trimetallic nitride template compound after application of an electric field (E).

The effect of an electric field on the trimetaspheres of the present invention is depicted in FIGS. 2A and 2B. FIG. 2A depicts the molecular dipoles (dipole moments) of the trimetaspheres prior to the application of the electric field (E). For the non-derivitized trimetaspheres, this is also what occurs when the electric field has been removed. Essentially, the molecules randomize to their lowest electric state. When an electric field (E) has been applied, the molecular dipoles orient resulting in a change in the dielectric properties of the compound. These dielectric properties include but are not limited to the dielectric constant, capacitance, and dielectric strength. A molecular dipole (or dipole moment) is a combination of two electrical or magnetic charges of opposite sign separated by a small distance, intrinsic to a polar molecule due to its molecular structure. Furthermore, the dielectric properties of the material can be effectively tuned (as shown in FIG. 2B) with the use of an external stimulus, such as a modulation in the electric field. Thus, by the present invention, one is able to change the dielectric properties of a material (such as the dielectric constant, capacitance, and dielectric strength) within a range defined by the materials by adjusting the magnitude and direction of an applied field. Moreover, it was discovered that when the trimetaspheres of the present invention are employed, this effect can be accomplished at very low (less than about 5 volts) voltages while the physical dimensions of the compounds remain essentially unchanged.

Figure 3:
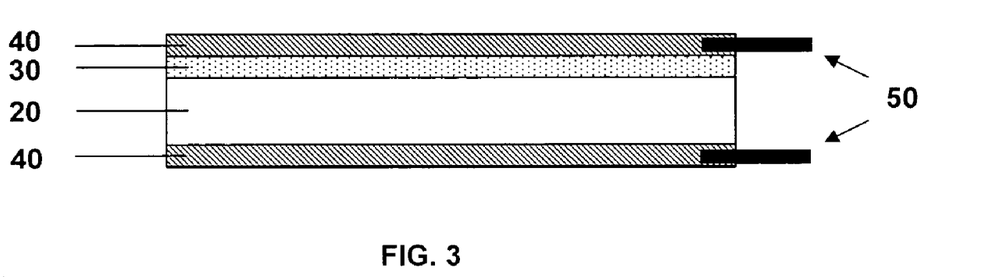
FIG. 3 is a schematic representation of a capacitor as the tunable dielectric device of the present invention.

In a preferred embodiment of the invention, shown in FIG. 3, the tunable dielectric device has a conductive film applied to the substrate. When this is done, a capacitor is created. Referring now to FIG. 3, the substrate 20 has the trimetasphere compound 30 deposited on one side. Any method of deposition known to one of ordinary skill in the art may be employed to deposit the trimetasphere compound on the substrate. For example, deposition may occur by spin coating; vapor deposition; casting; spray coating; and dipping. Preferably, the trimetaspheres are deposited by vapor deposition. A conductive film 40 is applied to either side of the substrate 20. Thus, the conductive film is placed directly over the trimetasphere compound 30 on one side, whereas the other side of the substrate (that which is not coated) is covered directly by the conductive film 40. Any conductive film known to one of ordinary skill in the art may be employed, provided that it is capable of conducting an electric current. The purpose of the conductive film is to form an AC or DC voltage bias across the trimetasphere layer. In a further embodiment of the invention, at least one pair of electrodes 50 is attached to the conductive film. The number of electrode pairs may be multiple depending on the final application. The electrodes are useful for creating a voltage bias across the trimetasphere layer.

With this configuration in mind, the dielectric constant is a measure of the electric charge that a given substance can withstand at a given electric field strength. The dielectric strength of a material is a measure of the resistance of a material to electrical breakdown under the influence of a strong electric field. The capacitance of a device, such as a parallel plate capacitor, is directly proportional to the dielectric constant of a material according to the following equation:

$$C = \varepsilon \cdot A d^{-1} = Q V^{-1}$$

where:
C is the capacitance
A is the area of the electrodes
d is the distance between the electrodes
$\varepsilon$ is the dielectric constant of the material between the electrodes
Q is the charge stored
V is the potential between the electrodes.

The voltage is applied by the application of an AC or DC voltage bias across the trimetasphere compound. In a more preferred embodiment, the voltage is applied at a variable rate such that the rate is determined by the speed of flipping from positive to negative. As stated earlier, the discovery in this invention is that the molecular dipole moments can be changed by employing a voltage of less than about 5 volts to the endohedral fullerene encapsulating trimetallic nitride template compound. In a preferred embodiment, the voltage applied is less than about 2 volts. In an alternative embodiment the voltage applied is about 0.1 volts. The AC voltage frequency has a useful range from 1 Hz to 1000 GHz depending on the specific application.

In another embodiment of the invention, the trimetasphere compounds are incorporated into a host polymer matrix prior to application to the substrate. Either the derivatized or non-derivatized trimetaspheres are employed. Any polymer matrix known to one of ordinary skill in the art is suitable and may be a neat polymer or filled polymer matrix. A polymer solution containing a controlled concentration of the dielectric materials in a host matrix is cast as a thin film on a substrate via spin coating, dip coating, or a related method.

The advantage of these materials is the very low and measurable rotational barrier for the metal atoms within the cage allowing for very fast alignment and relaxation of the resulting dipole moment. This makes them very applicable to the very high frequencies (>1 MHz), in particular, those used for microwave applications (1–1000 GHz). This technology revolutionizes the fabrication of microwave switching and phase shifting components by reducing size, cost and power requirements while improving performance compared to existing component technologies. In addition, the electric field can be varied by changing the potential difference across the material, thus making them tunable. For example, a differential potential (i.e. voltage) can be placed on two conducting plate electrodes positioned on either side of a thin film insulating material, thus creating an electric field.

Figure 4A:
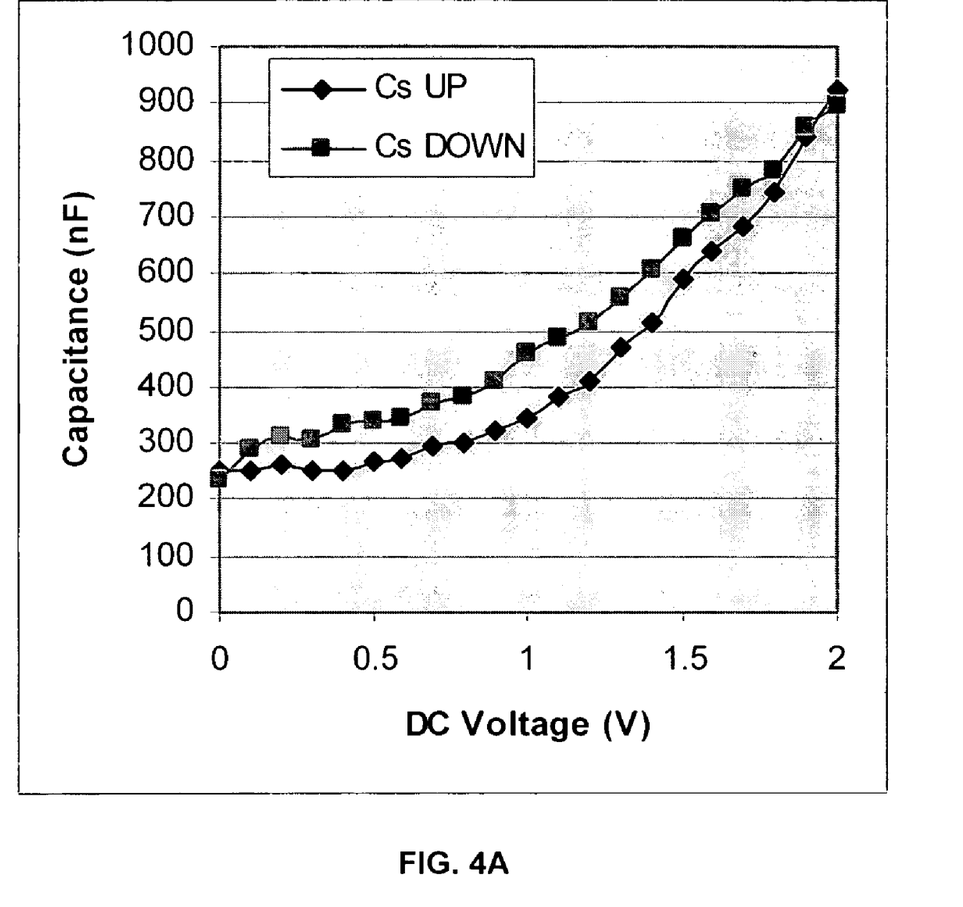
FIG. 4A is a plot of capacitance versus voltage at 10 Hz for a $Gd_2ScN@C_{80}$ parallel plate capacitor.
Figure 4B:
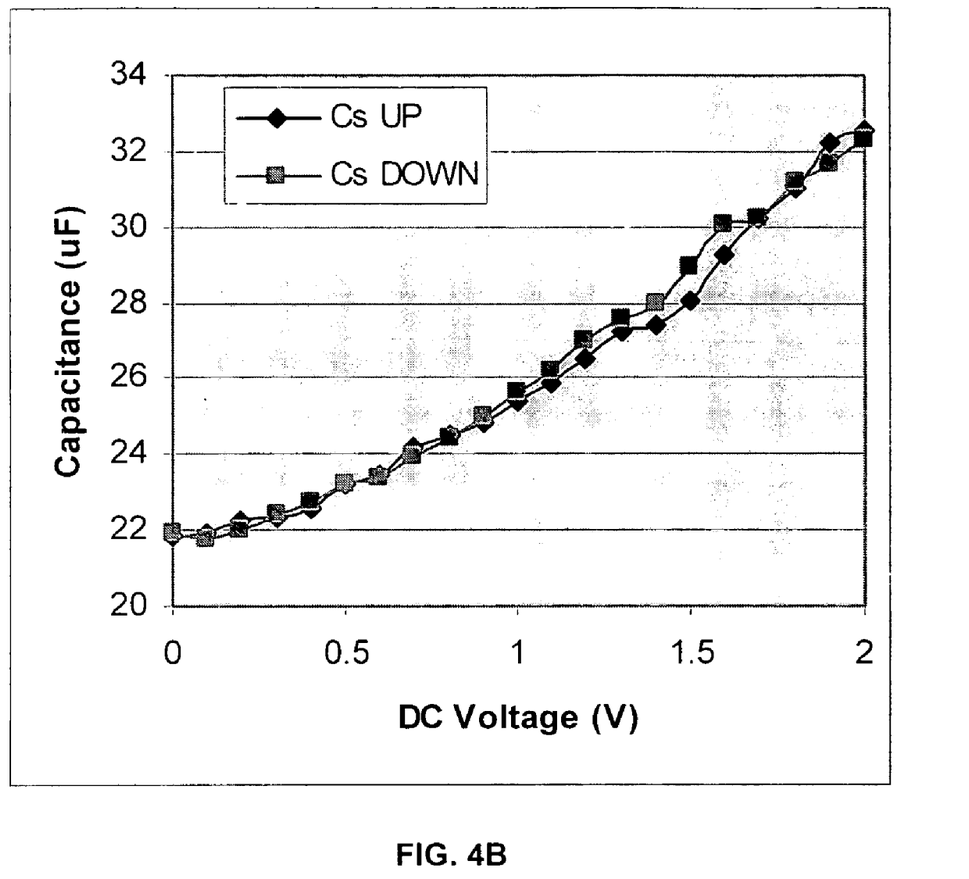
FIG. 4B is a plot of capacitance versus voltage at 100 Hz for a $Gd_2ScN@C_{80}$ parallel plate capacitor.
Figure 4C:
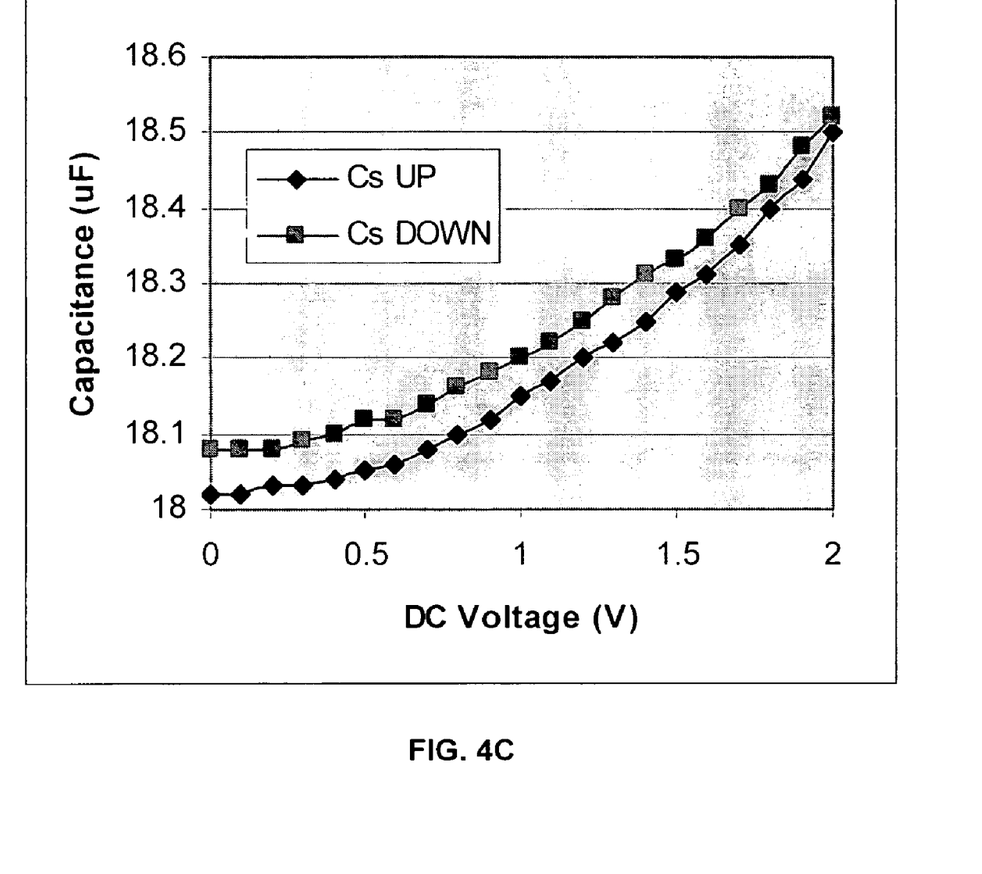
FIG. 4C is a plot of capacitance versus voltage at 10 kHz for a $Gd_2ScN@C_{80}$ parallel plate capacitor.

EXAMPLE $Gd_2ScN@C_{80}$ was prepared by an electric-arc synthesis method consisting of the vaporization of metal doped carbon rods in a plasma whereby carbon, metal, and nitrogen atoms combined to form endohedral metallofullerenes of which trimetaspheres (e.g., $Gd_2ScN@C_{80}$ and $GdSc_2N@C_{80}$) are representatives of the class of endohedral metallofullerenes. The plasma produced soot contains empty-cage fullerenes and trimetasphere endohederal metallofullerenes. The trimetasphers were extracted, separated, isolated and purified to 99+% purity. Thin films 134 nm thick were deposited onto an indium tin oxide (ITO) coated glass slide with an Edwards vacuum deposition system under a reduced pressure of $5 \times 10^{-5}$ Torr. A thin layer of aluminum was deposited on the top of this material via physical vapor deposition with an Edwards evaporation system to a thickness of 1 micron. Voltage versus capacitance was measured with an inductance-capacitance-resistance (LCR) meter. The plots, shown in FIGS. 4A–C, show that capacitance increased when the DC bias voltage was increased. These results were unexpected in view of the prior art. A capacitor normally does not display a change in capacitance when a voltage is applied. Moreover, ferroelectric materials typically remain unchanged when these low voltages are applied.

The above description and drawings are only illustrative of preferred embodiments which achieve the objects, features and advantages of the present invention, and it is not intended that the present invention be limited thereto. Any modification of the present invention which comes within the spirit and scope of the following claims is considered part of the present invention.

What is claimed is:

1. A process for making a tunable dielectric device, the process comprising the steps of:
    a) providing a substrate;
    b) depositing an endohedral fullerene encapsulating trimetallic nitride template compound on the substrate, wherein the endohedral fullerene encapsulating trimetallic nitride template compound has the formula:

$A_{3-n}X_nN@C_m$ where:
    n is either 1 or 2;
    m ranges from about 68 to about 200;
    A is a first metal;

X is a second metal; and
    wherein the endohedral fullerene encapsulating trimetallic nitride template compound has a dipole moment; and
    c) applying a voltage of less than about 5 volts to the endohedral fullerene encapsulating trimetallic nitride template compound wherein the dipole moment is oriented by adjusting magnitude and direction of the voltage and wherein physical dimension of the endohedral fullerene encapsulating trimetallic nitride template compound is essentially unchanged.

2. A process according to claim 1, further comprising the step of applying a conductive film to the substrate.

3. A process according to claim 2, further comprising the step of attaching at least one pair of electrodes to the conductive film.

4. A process according to claim 1, wherein the endohedral fullerene encapsulating trimetallic nitride template compound is deposited on the substrate by a method selected from the group consisting of: spin coating; vapor deposition; casting; spray coating; and dipping.

5. A process according to claim 4, wherein the endohedral fullerene encapsulating trimetallic nitride template compound is deposited on the substrate by vapor deposition.

6. A process according to claim 1, further comprising the step of mixing the endohedral fullerene encapsulating trimetallic nitride template compound with a host polymer matrix prior to depositing the endohedral fullerene encapsulating trimetallic nitride template compound on the substrate.

7. A process according to claim 1, wherein the endohedral fullerene encapsulating trimetallic nitride template compound has the formula:

$A_{3-n}X_nN@C_m$ where:
n is either 1 or 2;
m is 80;
A is Scandium; and
X is a metal other than Scandium.

8. A process according to claim 1, wherein the endohedral fullerene encapsulating trimetallic nitride template compound is derivatized with at least one organic group, wherein the endohedral fullerene encapsulating trimetallic nitride template compound has the formula:

$A_{3-n}X_nN@C_m(R)_z$ where:
n is either 1 or 2;
m ranges from about 68 to about 200;
A is a first metal;
X is a second metal;
R is an organic group; and
Z is less than or equal to m.

9. A process according to claim 8, further comprising the step of mixing the derivatized endohedral fullerene encapsulating trimetallic nitride template compound with a host polymer matrix prior to depositing the derivatized endohedral fullerene encapsulating trimetallic nitride template compound on the substrate.

10. A process according to claim 1, wherein a voltage of less than about 2 volts is applied to the endohedral fullerene encapsulating trimetallic nitride template compound.

11. A process according to claim 1, wherein a voltage of 0.1 volts is applied to the endohedral fullerene encapsulating trimetallic nitride template compound.

12. A process according to claim 1, wherein the voltage is applied by biasing a voltage across the endohedral fullerene encapsulating trimetallic nitride template compound.

13. A process according to claim 1, wherein the voltage is applied at a variable rate.

14. A tunable dielectric device prepared by the process according to claim 1.

15. A tunable dielectric device prepared by:
a) providing an electrically conductive substrate having two sides;
b) depositing by vapor deposition an endohedral fullerene encapsulating trimetallic nitride template compound having a dipole moment on one side of the electrically conductive substrate;
d) covering both sides of the electrically conductive substrate with a conductive film;
e) applying a bias voltage of less than about 2 volts to the covered substrate wherein the dipole moment of the endohedral fullerene encapsulating trimetallic nitride template compound is oriented by adjusting magnitude and direction of the voltage and wherein physical dimensions of the endohedral fullerene encapsulating trimetallic nitride template compound are essentially unchanged.

16. A tunable dielectric device comprising:
a) a substrate; and
b) an endohedral fullerene encapsulating trimetallic nitride template compound having the formula:

where:
n is either 1 or 2;
m ranges from about 68 to about 200;
A is a first metal;
X is a second metal
the endohedral fullerene encapsulating trimetallic nitride template compound disposed on the substrate wherein the endohedral fullerene encapsulating trimetallic nitride template compound has a dipole moment that is aligned when a voltage of less than about 5 volts is applied thereto.

17. A tunable dielectric device according to claim 16, wherein A is selected from the group consisting of: Gadolinium, Scandium, Yttrium; Lanthinum; Cerium; Praseodyminium; Neogymium; Terbium; Dysprosium; Holmium; Erbium; Thulium; Ytterbium; and Lutetium.

18. A tunable dielectric device according to claim 16, wherein X is selected from the group consisting of: Gadolinium, Scandium, Yttrium; Lanthinum; Cerium; Praseodyminium; Neogymium; Terbium; Dysprosium; Holmium; Erbium; Thulium; Ytterbium; and Lutetium.

19. A tunable dielectric device according to claim 16, wherein A is Scandium; X is any metal that is not Scandium; and m is 80.

20. A tunable dielectric device according to claim 16, wherein wherein the endohedral fullerene encapsulating trimetallic nitride template compound is derivatized with at least one organic group, wherein the endohedral fullerene encapsulating trimetallic nitride template compound has the formula:

where:
n is either 1 or 2;
m ranges from about 68 to about 200;
A is a first metal;
X is a second metal;
R is an organic group; and
Z is less than or equal to m.

21. A tunable dielectric device according to claim 16, further comprising a host polymer matrix blended with the endohedral fullerene encapsulating trimetallic nitride template compound.

22. A tunable dielectric device according to claim 20, further comprising a host polymer matrix blended with the derivatized endohedral fullerene encapsulating trimetallic nitride template compound.

23. A tunable dielectric device according to claim 16, further comprising a conductive film disposed on the substrate.

24. A tunable dielectric device according to claim 23, wherein the substrate is prepared from aluminum.

25. A tunable dielectric device according to claim 23, further comprising at least one pair of electrodes affixed to the conductive film.

26. A tunable dielectric device according to claim 16, wherein the tunable dielectric device is selected from the group consisting of: tunable filters, resonators, filters, phase shifters, phased array antennae, rectennae, and variable capacitors.

27. A tunable dielectric device according to claim 26, wherein the tunable dielectric device is a variable capacitor.

* * * * *